United States Patent
Wang et al.

(10) Patent No.: US 11,876,263 B1
(45) Date of Patent: Jan. 16, 2024

(54) CATHODE EJECTOR COOLING FLOW CONTROL SYSTEM

(71) Applicant: ZeroAvia, Inc., Hollister, CA (US)

(72) Inventors: Hung-Chi Wang, Gilroy, CA (US); Matthew Legg, Swindon (GB); Rudolf Jacobus Coertze, Gloucestershire (GB)

(73) Assignee: ZEROAVIA, INC., Hollister, CA (US)

( * ) Notice: Subject to any disclaimer, the term of this patent is extended or adjusted under 35 U.S.C. 154(b) by 0 days.

(21) Appl. No.: 18/162,559

(22) Filed: Jan. 31, 2023

(51) Int. Cl.
| | |
|---|---|
| *H01M 8/04* | (2016.01) |
| *H01M 8/04746* | (2016.01) |
| *H01M 8/04014* | (2016.01) |
| *H01M 8/04007* | (2016.01) |
| *B64D 33/10* | (2006.01) |
| *B60L 58/33* | (2019.01) |
| *B60L 50/70* | (2019.01) |
| *B64D 27/24* | (2006.01) |

(52) U.S. Cl.
CPC ......... *H01M 8/04761* (2013.01); *B60L 50/70* (2019.02); *B60L 58/33* (2019.02); *B64D 27/24* (2013.01); *B64D 33/10* (2013.01); *H01M 8/04014* (2013.01); *H01M 8/04067* (2013.01); *H01M 8/04768* (2013.01); *B60L 2200/10* (2013.01); *H01M 2250/20* (2013.01)

(58) Field of Classification Search
CPC ......... H01M 8/04761; H01M 8/04014; H01M 8/04067; H01M 8/04768
See application file for complete search history.

(56) References Cited

U.S. PATENT DOCUMENTS

| | | | |
|---|---|---|---|
| 2018/0166711 A1* | 6/2018 | Kwon | H01M 8/04126 |
| 2022/0009379 A1* | 1/2022 | Mikic | H01M 8/04738 |

OTHER PUBLICATIONS

Theodorsen, et al. Full-Scale tests of a New Type NACA Nose-Slot Cowling, National Advisory Committee for Aeronautics, Report No. 595, 1937, 16 pages.

\* cited by examiner

*Primary Examiner* — Olatunji A Godo
(74) *Attorney, Agent, or Firm* — HAYES SOLOWAY P.C.

(57) ABSTRACT

An integrated hydrogen-electric includes a hydrogen fuel cell; a hydrogen fuel source; an electric motor assembly disposed in electrical communication with the fuel cell; n air compressor system configured to be driven by the motor assembly, and a cooling system having a heat exchanger radiator in a duct of the cooling system, and configured to direct an air stream including an air stream from the air compressor through the radiator, wherein an exhaust stream from a cathode side of the fuel cell is fed via an flow control nozzle into the air stream in the cooling duct downstream of the radiator.

13 Claims, 7 Drawing Sheets

CATHODE EJECTOR COOLING FLOW CONTROL SYSTEM

TECHNICAL FIELD

The present disclosure relates to heat management of fuel cells. The disclosure has particular utility in the case of PEM (Proton Exchange Membrane) fuel cell systems such as hydrogen fuel cells on board vehicles including aircraft and will be described in connection with such utility, although other utilities are contemplated.

BACKGROUND AND SUMMARY

This section provides background information related to the present disclosure which is not necessarily prior art. This section provides a general summary of the disclosure and is not a comprehensive disclosure of its full scope or all its features.

A fuel cell is an electrochemical cell that converts chemical energy into electrical energy by spontaneous electrochemical reduction-oxidation (redox) reactions. Fuel cells include an anode and a cathode separated by an ionically conductive electrolyte. During operation, a fuel (e.g., hydrogen) is supplied to the anode and an oxidant (e.g., oxygen or air) is supplied to the cathode. The fuel is oxidized at the anode, producing positively charged ions (e.g., hydrogen ions) and electrons. The positively charged ions travel through the electrolyte from the anode to the cathode, while the electrons simultaneously travel from the anode to the cathode outside the cell via an external circuit, which produces an electric current. The oxidant supplied to the cathode is reduced by the electrons arriving from the external circuit and combines with the positively charged ions to form water. The reaction between oxygen and hydrogen is exothermic, generating heat that needs to be removed from the fuel cell.

Fuel cells may be used as power sources for electric motors of electric vehicles and hybrid electric vehicles, including aircraft. In such applications, fuel cells oftentimes are arranged in stacks of multiple cells and connected in a series or parallel arrangement to achieve a desired power and output voltage. Cooling systems for fuel cell-powered vehicles oftentimes use an airflow generated during movement of the vehicle as a heat transfer medium. For example, an ambient airflow may be directed from outside the vehicle through an air intake of the vehicle and through one or more heat exchangers disposed within the vehicle. An airflow generated in this manner is oftentimes referred to as ram air and, when ram air is used as a cooling medium in a vehicle, the vehicle may experience increased drag, which may reduce the energy efficiency of the vehicle.

Newton's law of cooling states that the rate of heat transfer is proportional to the temperature difference between the environment and object. Low temperature difference implies low heat transfer rate with a given area and heat transfer coefficient. The result is that the thermal management system requires a high coolant flow rate and large radiator core face area for a given freestream dynamic pressure.

The power absorbed by the heat exchanger is related to the velocity of the air passing over the heat exchanger which requires a favorable pressure gradient in the direction of flow. For a ram air-cooled heat exchanger this pressure gradient comes about due to partial stagnation of the incoming freestream flow and is limited by the freestream dynamic pressure. One may conclude that to reduce heat exchanger face area a higher air velocity is required which will command a higher pressure differential across the heat exchanger. Since the pressure drop across the heat exchanger and associated ducting must be equal to the available pressure difference (e.g. freestream dynamic pressure) there is a physical lower limit to the size of the heat exchanger. In order to further reduce the heat exchanger size a means of mechanically driving airflow is required, for example a fan or the present invention.

In fuel cell-powered aircraft, a major challenge of ram air cooling is when the aircraft is sitting/taxiing on the ground and during the takeoff and climb, when the power output demanded of the fuel cells—and the amount of waste heat generated by the fuel cells is greatest. During takeoff and climb. 100% power output is only needed for 60-120 seconds on takeoff and initial climb to 1,000 feet. After 1,000 feet, power may be reduced by 20% for the normal climb portion of the flight, and the fuel cell powerplant typically operates at a higher efficiency, resulting in 30% lower heat output. Waste heat generated during operation of powered aircraft may be dissipated by positioning an air-cooled heat exchanger in an ambient airflow path through the aircraft. When the aircraft is sitting/taxiing on the ground, the propellor slipstream provides sufficient airflow for cooling. However, during takeoff roll (from zero velocity until takeoff speed), and potentially also during initial climb-out, airflow across the heat exchange surface is very low, which makes the capacity of the heat rejection system much lower during that stage of flight. Moreover, directing ambient air to flow through the aircraft (instead of around the aircraft) when the aircraft is moving creates drag, with the amount of drag experienced by the aircraft varying with the volume of ambient air directed through the aircraft (and thus through the heat exchanger) and the pressure drop across the heat exchanger. Traditionally an air-cooled heat exchanger system is integrated into a vehicle where the slipstream is available. However, for aircraft converted with hydrogen fuel cell powered propulsion systems, due to limitations of structure or weight and balance, the optimal location for installing the air-cooled heat exchanger system might not be available. Insufficient cooling during the ground operation may cause significant operational difficulty and potentially cause damage to the hydrogen fuel cell powered propulsion system.

During the takeoff phase, the airspeed is low but the hydrogen fuel cell powered propulsion systems generate maximum power and thus maximum thermal energy to be dissipated. Low airspeed implies low cooling capability. This is the phase where the thermal management system is under the maximum operating stress. Usually the radiator face area is sized in accordance with this operating condition.

In practice, the volume of the air-cooled heat exchanger (and the volume of air directed through the heat exchanger) may be selected to accommodate the most demanding cooling requirements of the aircraft, which may occur when the aircraft is operating under high load conditions, e.g., during takeoff and climb. However, sizing the heat exchanger in this way may cause the aircraft to experience an unnecessarily large amount of drag when the aircraft is operating under low load conditions, e.g., during cruise, when minimal waste heat dissipation is needed. In addition, when cooling requirements are low, the presence of an oversized heat exchanger onboard the aircraft adds unnecessary weight and bulk to the aircraft.

In accordance with the present disclosure, we inject the fuel cell cathode exhaust in the outlet section of the cooling duct through a flow control nozzle to entrain further airflow in the outlet section which increases the pressure gradient across the upstream heat exchanger thereby increasing air mass flow through the heat exchanger. In practice, the fuel cell chamber may be supplied with high pressure air from a compressor that is driven by a gearbox linked to a motor. The compressed air pushes through the fuel cell stacks and exits through the exhaust at the cathode side mixing with water vapor and air. The residue of the compressed air still contains some kinetic energy and pressure. Furthermore, heating of the air through the fuel cell stack will increase its temperature and cause it to expand increasing the volumetric flow available. In accordance with the present disclosure, we inject the cathode exhaust through a flow control nozzle into the outlet section of the heat exchanger ducting, creating a high speed air jet which entrains the surrounding air in the heat exchanger ducting. That is to say, the entrainment of air may be caused predominantly by shear mixing between the jet and entrained flow. This phenomenon increases the available pressure gradient and mass flow rate through the heat exchanger ducting system. In alternate embodiments, cathode exhaust may be mixed with bleed air from the compressor before the ejector.

As long as the fuel cell system is operating, the ejector is supplied with moving air, even when the aircraft is in stationary or low speed taxiing. During takeoff and cruise, the additional pressure drop caused by the ejector increases air mass flow through the heat exchanger, thereby enhancing cooling capability of the heat exchanger. Thus, the face area of the heat exchanger can be reduced. Since additional airflow is introduced into the cooling system, the momentum drag can be reduced, or even eliminated. Also, the cooling system can be reduced in size and weight.

Also, in the case of prior art hydrogen fuel cell powered vehicles such as aircraft, cooling airflow control traditionally has been accomplished using cowling flaps or sliding panels to regulate outlet flow speed. This is the predominant way to effectively control the quantity of airflow into the cooling installation with minimum drag penalty. However, the mechanical devices required to affect such control introduce complexity and additional weight to the aircraft. As will be described below, using a cathode exhaust flow control nozzle in accordance with the present disclosure provides a simple, lightweight but effective alternative to regulate flow and improve cooling capability. The use of a cathode exhaust flow control nozzle also serves essentially to recycle the wasted energy out of the cathode exhaust. As a result, it improves the overall system's efficiency.

In one aspect of the disclosure there is provided an integrated hydrogen-electric engine comprising: a hydrogen fuel cell; an air inlet coupled to a cooling duct having a radiator in the cooling duct, and configured to direct an air stream from the air inlet through the radiator, and/or wherein an exhaust stream from a cathode side of the fuel cell is fed into the cooling duct.

In one aspect the integrated hydrogen-electric engine comprises a motor assembly is configured to drive a propulsor.

In another aspect, the exhaust stream is fed via a flow control nozzle into the air stream in the cooling duct downstream of the radiator.

In another aspect the exhaust stream is fed via a flow control nozzle into the air stream in the cooling duct upstream of the radiator.

In another aspect the duct includes a constructed section downstream of the flow control nozzle.

In still another aspect, the flow control nozzle is configured to inject the exhaust stream from the cathode side of the fuel cell tangentially to the air stream in the duct.

In a further aspect the engine comprises a valve configured to regulate mass flow or pressure of the cathode exhaust stream at the flow control nozzle.

In yet another aspect a bypass outlet is provided upstream of the flow control nozzle configured to maintain back pressure on the fuel cell.

In a further aspect the integrated hydrogen engine is on board a vehicle including, but not limited to an airplane.

In another aspect, the integrated hydrogen engine is on board an airplane, and the duct is integrated into wings, and/or a fuselage of the aircraft.

The disclosure also provides a method for cooling a fuel cell aboard a vehicle, wherein the vehicle includes an integrated hydrogen-electric engine comprising: a hydrogen fuel cell; an air inlet coupled to a cooling duct, and a cooling system having a radiator in the cooling duct, the step of directing an air stream from the air inlet through the radiator, and/or feeding an exhaust stream from a cathode side of the fuel cell into the cooling duct.

In one aspect of the method the exhaust stream is fed via a flow control nozzle into the air stream in the cooling duct downstream of the radiator.

In another aspect of the method the exhaust stream is fed via a flow control nozzle into the air stream upstream of the radiator.

In another aspect of the method the cooling duct includes a constricted section configured for decreasing pressure drop in air mass flow rate downstream of the flow control nozzle.

In a further aspect of the method the flow control nozzle is configured to inject the exhaust stream from the cathode side of the fuel cell tangentially to the airflow in the duct.

In yet another aspect of the method a valve is provided upstream of the flow control nozzle for regulating mass flow or pressure of the cathode exhaust stream at the flow control nozzle.

In a further aspect of the method a bypass outlet is provided upstream of the flow control nozzle configured to maintain back pressure on the fuel cell.

In yet a further aspect of the method the vehicle comprises an airplane, and the duct is integrated into wings and/or a fuselage of the aircraft.

In yet another aspect of the method a portion of the cathode exhaust is mixed with bleed air from an air compressor system prior to being fed into the cooling duct.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Further features and advantages of the instant disclosure will be seen from the following detailed description taken in conjunction with the accompanying drawings. The drawings described herein are for illustrative purposes only of selected embodiments and not all possible implementations and are not intended to limit the scope of the present disclosure.

DETAILED DESCRIPTION

Figure 1:
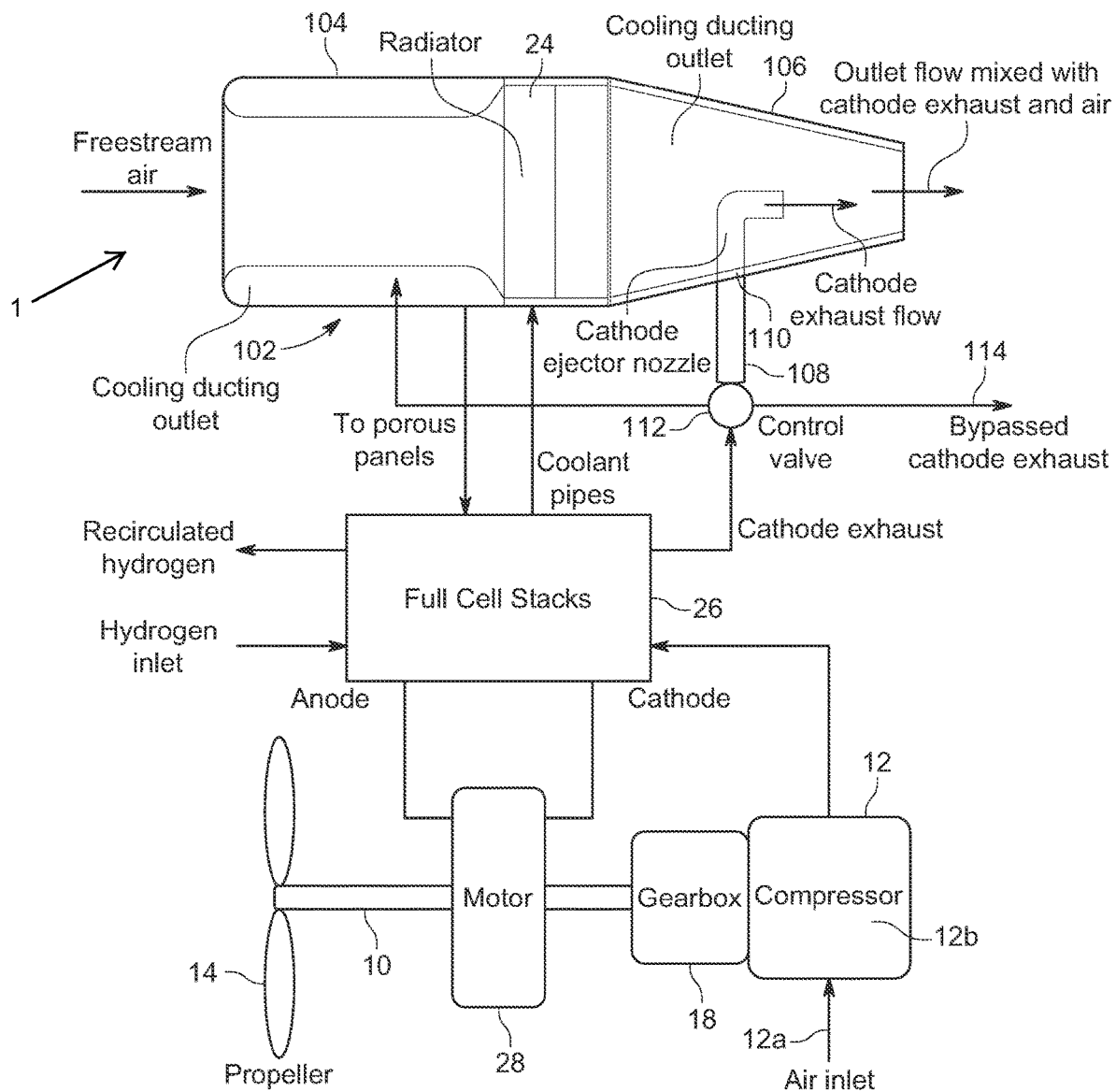
FIG. 1 is a schematic view of an integrated hydrogen-electric system in accordance with the present disclosure.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Also, as used herein the term "radiator" and "heat exchanger" may be used interchangeably.

The present disclosure has particular utility for use with proton-exchange membrane hydrogen fuel cells, or so-called hydrogen fuel cells, for powering aircraft, and will be described in connection with such utility, although the disclosure is not limited to hydrogen fuel cells for powering aircraft.

Although illustrative systems of this disclosure will be described in terms of specific aspects, various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, are to be considered within the scope of this disclosure.

In the following description, well-known functions or constructions are not described in detail to avoid obscuring the present disclosure in unnecessary detail.

FIG. 1 illustrates integrated hydrogen-electric engine system 1 that can be utilized, for example, in an aircraft turboprop or turbofan system, to provide a streamlined, light weight, power dense and efficient system. In general, integrated hydrogen-electric engine system 1 includes an elongated shaft 10 that extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump (not shown) in fluid communication with a fuel source (e.g., hydrogen), a heat exchanger radiator 24 in fluid communication with air compressor system 12, a fuel cell stack 26 in fluid communication with heat exchanger radiator 24, and a motor assembly 28 disposed in electrical communication with fuel cell stack 26.

Air compressor system 12 of integrated hydrogen-electric engine system 1 includes an air inlet portion 12a at a proximal end thereof and a compressor portion 12b that is disposed proximally of air inlet portion 12a for uninterrupted, axial delivery of airflow in the proximal direction. Compressor portion 12b supports a plurality of longitudinally spaced-apart rotatable compressor wheels (not shown) (e.g., multi-stage) that rotate in response to rotation of elongated shaft 10 for compressing air received through air inlet portion 12a for pushing the compressed air to fuel cell stack 26. As can be appreciated, the number of compressor wheels/stages and/or diameter, longitudinal spacing, and/or configuration thereof can be modified as desired to change the amount of air supply, and the higher the power, the bigger the propulsor 14. These compressor wheels can be implemented as axial or centrifugal compressor stages. Further, the compressor can have one or more bypass valves and/or wastegates (not shown) to regulate the pressure and flow of the air that enters the downstream fuel cell, as well as to manage the cold air supply to any auxiliary heat exchangers in the system.

Compressor 12 can optionally be mechanically coupled to elongated shaft 10 via a gearbox 18 to change (increase and/or decrease) compressor turbine rotations per minute (RPM) and to change the airflow to fuel cell stack 26. For instance, gearbox 18 can be configured to enable the air flow, or portions thereof, to be exhausted for controlling a rate of airflow through the fuel cell stack 26, and thus, the output power.

Integrated hydrogen-electric engine system 1 further includes a gas management system such as a heat exchanger radiator 24 disposed concentrically about elongated shaft 10 and configured to control thermal and/or humidity characteristics of the compressed air from air compressor system 12 for conditioning the compressed air before entering fuel cell stack 26. Integrated hydrogen-electric engine system 1 further also includes a fuel source of fuel (e.g., liquid hydrogen—LH2, or cold hydrogen gas) that is operatively coupled to heat exchanger radiator 24 via a pump (not shown) configured to pump the fuel from fuel source to heat exchanger radiator 24 for conditioning the compressed air. In particular, the fuel, while in the heat exchanger 24, becomes gasified because of heating (e.g., liquid hydrogen converts to gas) to take the heat out of the system. The hydrogen gas then gets heated in the heat exchanger radiator 24 to a working temperature of the fuel cell 26 which also takes heat out of the compressed air, which results in a control of heat flow through the heat exchanger radiator 24. An optional heater can be coupled to or included with heat exchanger radiator 24 to increase heat as necessary to warm the hydrogen fuel, for instance, when running under a low power regime. Additionally, and/or alternatively, motor assembly 28 can be coupled to heat exchanger radiator 24 for looping in the cooling/heating loops from motor assembly 28 as necessary. Such heating/cooling control can be managed, for instance, via a controller (not shown). In embodiments, the fuel source (e.g., hydrogen) can be disposed in fluid communication with motor assembly 28 or any other suitable component to facilitate cooling of such components.

The pump also can be coaxially supported on elongated shaft 10 for actuation thereof in response to rotation of elongated shaft 10. Heat exchanger radiator 24 is configured to cool the compressed air received from air compressor system 12 with the assistance of the pumped liquid hydrogen.

Figure 2:
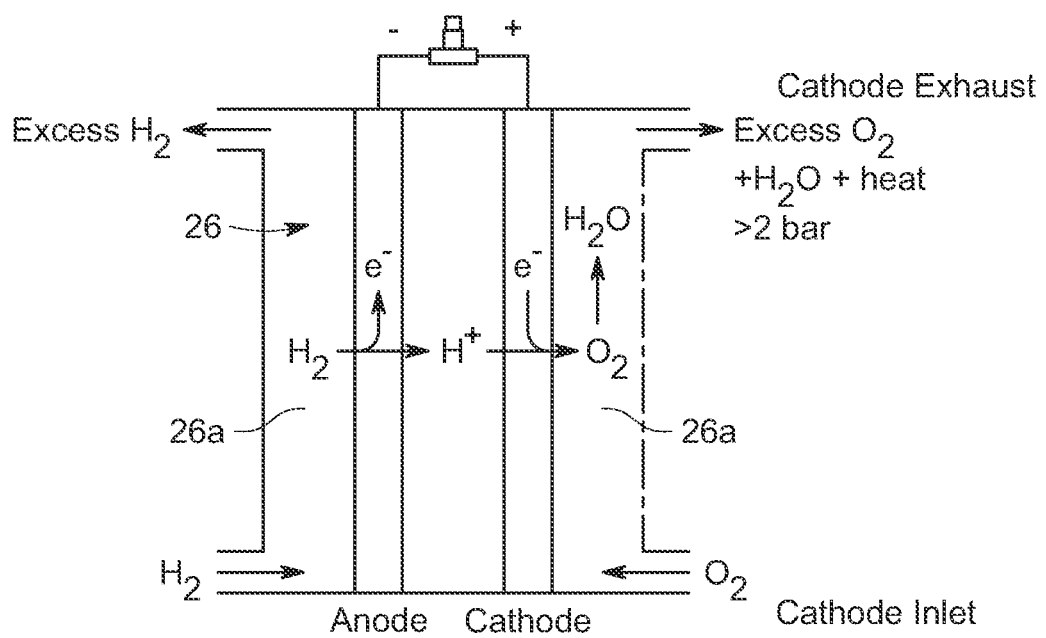
FIG. 2 is a schematic view of a fuel cell of the integrated hydrogen-electric engine system of FIG. 1.

With reference also to FIG. 2, integrated hydrogen-electric engine system 1 further includes an energy core in the form of a fuel cell stack 26, which may be circular, and is also coaxially supported on elongated shaft 10 such that air channels 26a of fuel cell stack 26 may be oriented in parallel relation with elongated shaft 10 (e.g., horizontally or left-to-right). Fuel cell stack 26 may be in the form of a low temperature proton-exchange membrane (LTPEM) fuel cell or a high temperature proton-exchange membrane (HT-PEM) fuel cell. The fuel cells of the fuel cell stack 26 are configured to convert chemical energy liberated during the electrochemical reaction of hydrogen and oxygen to electrical energy (e.g., direct current). Depleted air, water vapor and heat are exhausted from the cathode side of fuel cell stack 26, and injected into the cooling duct outlet of the heat exchanger radiator 24 to boost the cooling capacity of the heat exchanger radiator 24 by increasing the mass flow of air through the heat exchanger radiator 24 through application of the Bernoulli effect as will be described below. The electrical energy generated from fuel cell stack 26 is then transmitted to motor assembly 28, which is also coaxially/concentrically supported on elongated shaft 10, Integrated hydrogen-electric engine system 1 may include any number of external radiators (not shown) for facilitating airflow and adding, for instance, additional cooling. Notably, fuel cell stack 26 can include liquid cooled and/or air cooled cell types that so that cooling loads are integrated into heat exchanger 24 for reducing total amount of external radiators needed in the system. Further details of the air compressor system and the pump are found in our co-pending PCT Application No. PCT/US2022/73127, filed Jun. 23, 2022, the contents of which are incorporated herein by reference.

Integrated hydrogen-electric engine system 1 further includes a controller 200 (e.g., a full authority digital engine (or electronics) control (e.g., a FADEC) for controlling the various aspects of the integrated hydrogen-electric engine system 1 and/or other components of aircraft system. For instance, controller 200 can be configured to manage a flow of liquid hydrogen, manage coolant liquids from the motor assembly 28, manage, for example, any dependent auxiliary heater for the liquid hydrogen, manage rates of hydrogen going into fuel cell stack 26, manage rates of heated/cooled compressed air, and/or various flows and/or power of integrated hydrogen-electric engine system 1 including mass flow of cathode exhaust into the cooling duct outlet of the heat exchanger radiator 24 as will be described below. The algorithm for managing these thermal management components can be designed to ensure the most efficient use of the various cooling and heating capacities of the respective gases and liquids to maximize the efficiency of the system and minimize the volume and weight of same. For example, the cooling capacity of liquid hydrogen or cool hydrogen gas (post-gasification) can effectively be used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
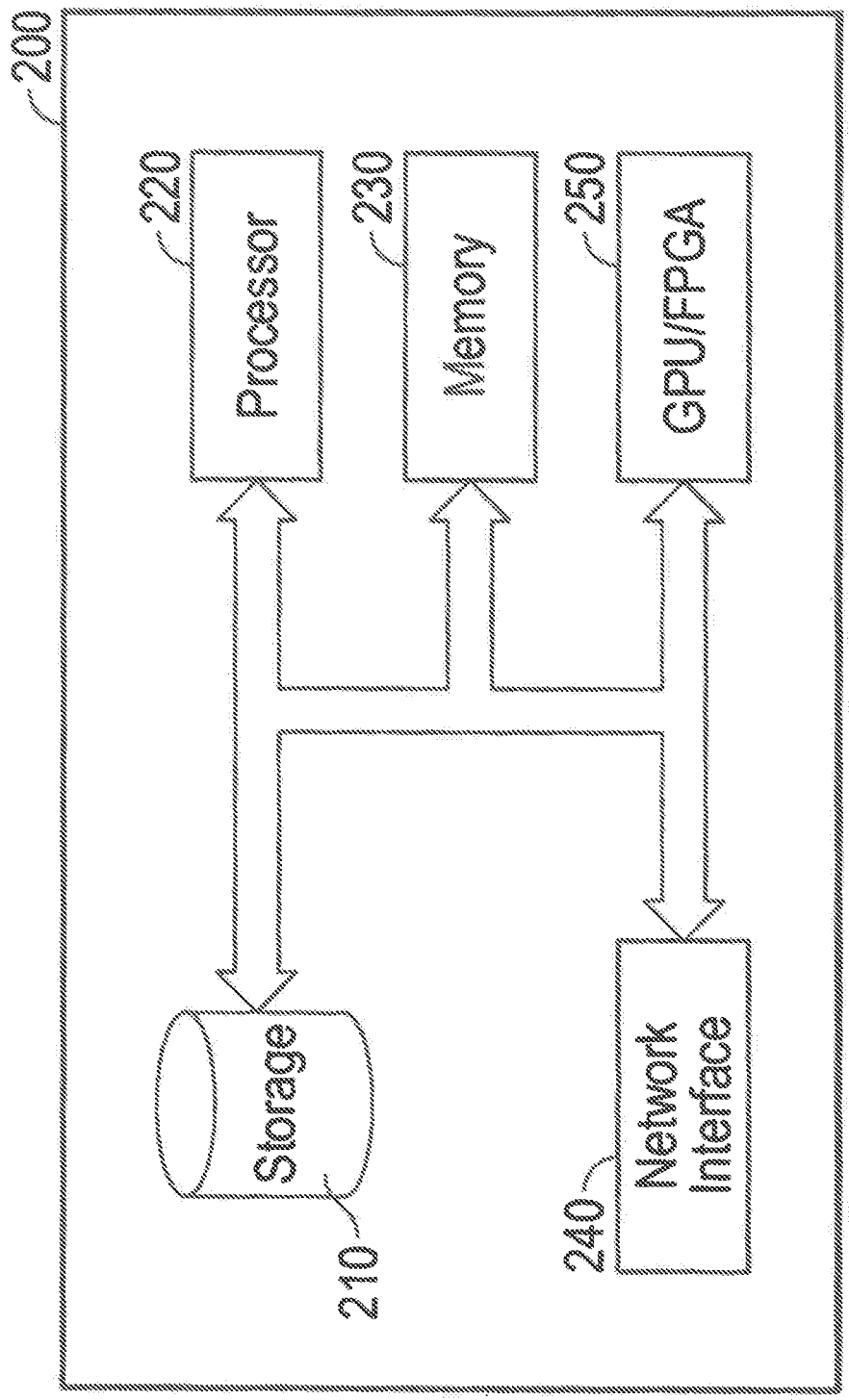
FIG. 3 is a block diagram of a controller configured for use with integrated hydrogen-electric engine system of FIG. 1.

FIG. 3 illustrates that controller 200 includes a processor 220 connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

Memory 230 can be random access memory, read-only memory, magnetic disk memory, solid-state memory, optical disc memory, and/or another type of memory. Memory 230 can be separate from the controller 200 and can communicate with the processor 220 through communication buses of a circuit board and/or through communication cables such as serial ATA cables or other types of cables. Memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

Controller 200 is configured to receive among other data, the fuel supply status, aircraft location, and control, among other features, the pumps, motors, sensors, etc.

Further, as can be appreciated, the integrated hydrogen-electric engine system 1 can include any number and/or type of sensors, electrical components, and/or telemetry devices that are operatively coupled to controller 200 for facilitating the control, operation, and/or input/out of the various components of integrated hydrogen-electric engine system 1 including specifically mass flow rate of cathode exhaust as will be described below, for improving efficiencies and/or determining errors and/or failures of the various components.

Figure 4:
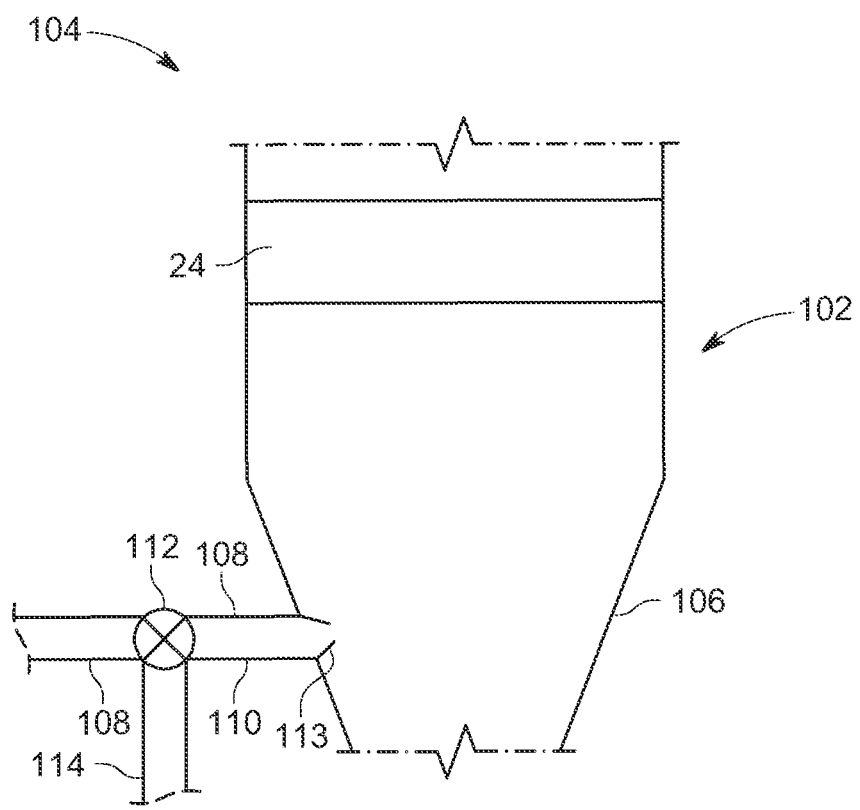
FIG. 4 is a schematic view of a portion of a ducted cooling system in accordance with the present disclosure.

Referring again to FIG. 1, ram air after passing through radiator 24 is streamed through exhaust nozzle 102. Exhaust nozzle 102 includes an inlet section 104 upstream of heat exchanger radiator 24, and a tapered outlet section 106. The cathode exhaust stream is plumbed to be injected via a flow control nozzle 110 into the tapered outlet section 106 via conduit 108, wherein the cathode exhaust stream is mixed with air flowing from exhaust nozzle inlet section 104 to exhaust nozzle outlet section 106. As seen particularly in FIG. 4, flow control nozzle 110 includes a tapered outlet 113 resulting in an increase in the velocity of the fluid, i.e., the cathode exhaust stream exiting the nozzle 110. This results in a decrease in pressure just beyond the outlet of the nozzle 110 which in turn increases the velocity of the air through exhaust nozzle 102. That is to say, the cathode exhaust stream velocity is accelerated immediately downstream of the nozzle 110 which creates a low-pressure, i.e., suction, that pulls the flowing air stream at the outlet of the exhaust nozzle 102 through by shear mixing between the jet and entrained flow. This in turn increases the pressure drop and mass flow rate of air in the duct 102. By way of example, when the nozzle 110 is activated during stationary condition, one may observe pressure drop immediately in front of the nozzle 110 outlet. As a result, the air mass flowing past the ejector nozzle gets pulled and velocity is established. A variable flow control valve 112 may be used to regulate the mass flow rate or the pressure of the cathode exhaust at nozzle 110. A bypass outlet 114 may be provided to maintain the back pressure of the fuel cell chamber when the total cathode exhaust is not fully ejected through the nozzle 110.

Figure 5A:
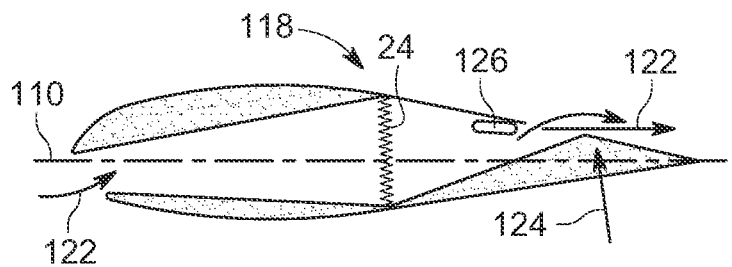
FIGS. 5a-5d are schematic views of ducted cooling systems incorporated into aircraft wings in accordance with the present disclosure.
Figure 5B:
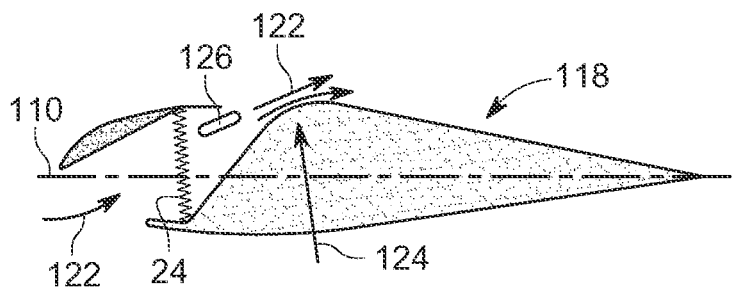
Figure 5C:
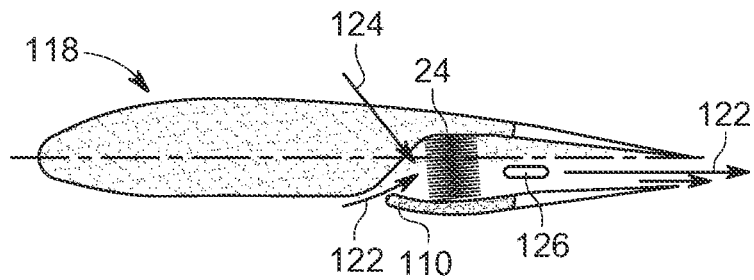
Figure 5D:
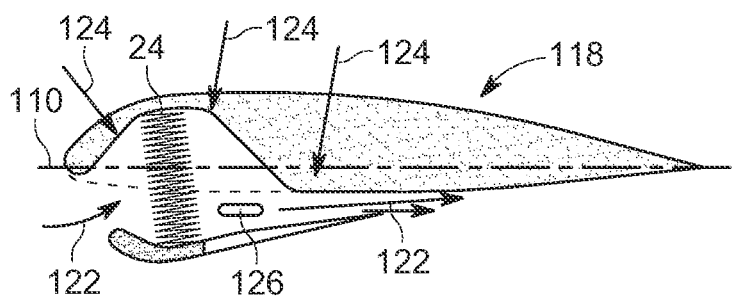

The cathode exhaust can be plumbed in the cooling ducting system as shown in FIG. 1, or by different passive flow control methods depending on the ducting design. FIGS. 5a, 5b, 5c and 5d, present cathode ejector locations in different ducting systems analogous, by example, to the wing 118 of an aircraft. In each use, the cathode flow nozzle is labeled at 110. Arrows labeled 122 show the direction of ejector flows. Arrows 124 show where the airflow tends to separate (concave up pointing toward outside of the airflow direction). As FIG. 5d shows, when there is a rapid increase and decrease in the inlet and outlet area in the ducting system, the flow tends to separate, forming a trapped vortex inside the ducting system. This phenomenon reduces the cooling efficiency of the radiator and results in higher drag. In the ducting outlet, the flow control nozzle 110 can be placed to point the energized flow parallel to the concave wall to stabilize the airflow near the surface, reducing flow separation. In the outlet or the location right behind the heat exchanger radiator 24, a small porous wall 126 can introduce a small amount of bleed air from the cathode exhaust to energize the airflow in the boundary layer and promote attachment of the ducted flow. While the foregoing description and drawings illustrate employing both ram airflow and supplemental cathode exhaust stream flow, either ram airflow or cathode exhaust stream flow may be used by itself In another embodiment, the cathode exhaust may be used for active flow control in the ductwork to delay or prevent flow separation, e.g., via boundary layer injections. Other embodiments provide flow control downstream of the radiator.

Figure 6A:
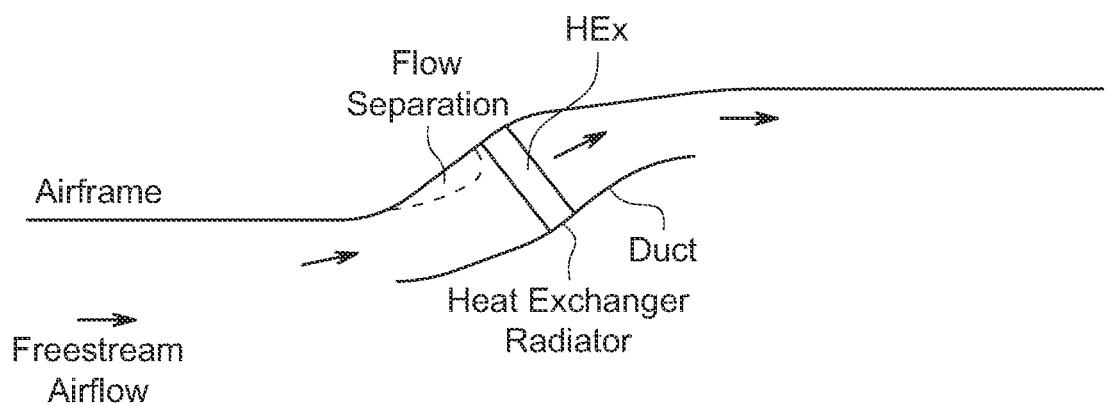
FIGS. 6a and 6b schematically illustrate duct flow patterns in accordance with other aspects of the present disclosure.
Figure 6B:
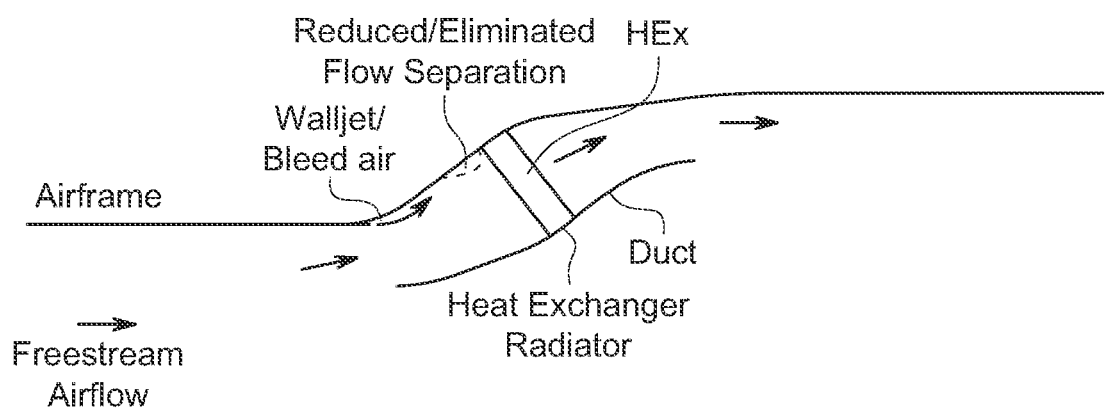

FIGS. 6a and 6b illustrate duct airflow with flow control (tangential wall jet or porous wall bleed) showing reduced or eliminated flow separation for inlet ducts. A similar principal may be applied to the outlet duct although benefits better manifest for inlet ducts to ensure uniform flow at the heat exchanger core face.

Figure 7:
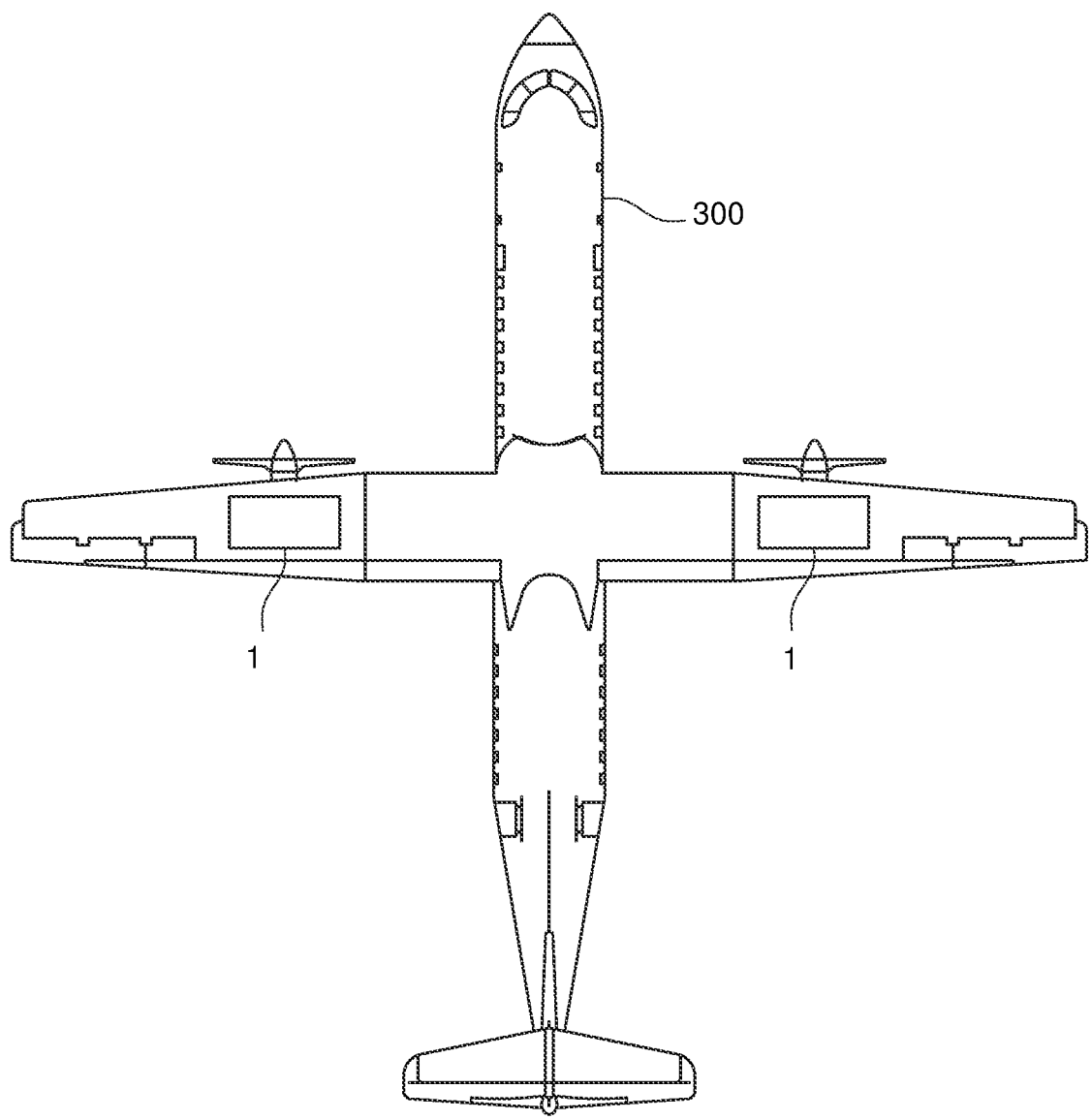
FIG. 7 schematically illustrates the present integrated hydrogen-electric engine system of FIG. 1, on an aircraft.

FIG. 7 depicts an integrated hydrogen-electrical engine system 1 of FIG. 1, installed on board an aircraft 300. While the integrated hydrogen-electric engine system 1 is shown as being installed on the wings of the aircraft 300, parts or all of the system could be installed on the fuselage of the aircraft.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Various changes and advantages may be made in the above disclosure without departing from the spirit and scope thereof. For example, a portion of the cathode exhaust may be mixed with bleed air from the compressor. Still other changes are possible.

What is claimed is:

1. A fuel cell powered airplane, comprising integrated hydrogen-electric engine including:
   a hydrogen fuel cell;
   an air inlet coupled to a cooling duct integrated into the aircraft, and
   a cooling system having a heat exchanger radiator in the cooling duct, and configured to direct an air stream comprising an air stream from the air inlet through the radiator, and wherein an exhaust stream from a cathode side of the fuel cell is fed into the cooling duct, wherein the cathode exhaust stream is fed via a flow control nozzle into the air stream in the cooling duct both upstream and downstream of the heat exchanger radiator, wherein the cathode exhaust feed into the air stream in the cooling duct downstream of the heat exchange radiator is introduced through a porous wall of the cooling duct.

2. The fuel cell powered aircraft of claim 1, wherein the duct includes a constricted section downstream of the flow control nozzle.

3. The fuel cell powered aircraft of claim 1, wherein the flow control nozzle is configured to inject the exhaust stream from the cathode side of the fuel cell tangentially to the air stream in the duct.

4. The fuel cell powered aircraft of claim 1, further comprising a valve configured to regulate mass flow or pressure of the cathode exhaust stream at the flow control nozzle.

5. The fuel cell powered aircraft of claim 1, further comprising a bypass outlet upstream of the flow control nozzle configured to maintain back pressure on the fuel cell.

6. A method for cooling a fuel cell aboard a fuel cell powered airplane, wherein the airplane includes an integrated hydrogen-electric engine including:
   a hydrogen fuel cell;
   an air inlet coupled to a cooling duct integrated into the aircraft, and
   a cooling system having a radiator in the cooling duct, the steps of:
   directing an air stream from the air inlet through the radiator, and
   feeding an exhaust stream from a cathode side of the fuel cell into the cooling duct, wherein the exhaust stream is fed via a flow control nozzle into the air stream in the cooling duct both upstream and downstream of the radiator, wherein the cathode exhaust feed into the airstream in the cooling duct downstream of the radiator is introduced through a porous wall of the cooling duct.

7. The method of claim 6, wherein the cooling duct includes a constricted section configured for decreasing pressure drop in air mass flow rate downstream of the cathode side exhaust stream feed.

8. The method of claim 6, wherein the exhaust stream from the cathode side of the fuel cell is fed tangentially to the air stream in the duct.

9. The method of claim 6, wherein a valve is provided upstream of the cathode side exhaust stream for regulating mass flow or pressure of the cathode exhaust stream at a flow control nozzle.

10. The method of claim 6, Wherein a bypass outlet is provided upstream of the cathode side exhaust stream feed to maintain back pressure on the fuel cell.

11. The method of claim 6, wherein a portion of the cathode side exhaust stream is mixed with bleed air from an air compressor system before being fed into the cooling duct.

12. The fuel cell powered aircraft of claim 1, wherein the cooling duct is integrated into wings and/or a fuselage of the aircraft.

13. The method of claim 6, wherein the cooling duct is integrated into wings and/or a fuselage of the aircraft.

* * * * *